(12) United States Patent
Kanaya et al.

(10) Patent No.: US 10,533,898 B2
(45) Date of Patent: Jan. 14, 2020

(54) INFRARED TEMPERATURE SENSOR

(71) Applicant: SHIBAURA ELECTRONICS CO., LTD., Saitama-shi, Saitama (JP)

(72) Inventors: Jun Kanaya, Semboku (JP); Tatsuya Konno, Saitama (JP)

(73) Assignee: SHIBAURA ELECTRONICS CO., LTD., Saitama-Shi, Saitama (JP)

(*) Notice: Subject to any disclaimer, the term of this patent is extended or adjusted under 35 U.S.C. 154(b) by 0 days.

(21) Appl. No.: 15/781,829

(22) PCT Filed: Sep. 1, 2017

(86) PCT No.: PCT/JP2017/031651
§ 371 (c)(1),
(2) Date: Jun. 6, 2018

(87) PCT Pub. No.: WO2018/116535
PCT Pub. Date: Jun. 28, 2018

(65) Prior Publication Data
US 2019/0234802 A1 Aug. 1, 2019

(30) Foreign Application Priority Data
Dec. 20, 2016 (JP) ................... 2016-246675

(51) Int. Cl.
*G01J 5/06* (2006.01)
*G01J 5/10* (2006.01)
(Continued)

(52) U.S. Cl.
CPC . *G01J 5/06* (2013.01); *G01J 5/02* (2013.01); *G01J 5/0818* (2013.01); *G01J 5/10* (2013.01); *G01J 2005/067* (2013.01)

(58) Field of Classification Search
CPC .... G01J 5/06; G01J 5/0818; G01J 5/10; G01J 2005/067
(Continued)

(56) References Cited

U.S. PATENT DOCUMENTS 6,367,972 B1 * 4/2002 Kamiyama ............... G01J 5/06
327/512
2014/0140712 A1 * 5/2014 Nakayama ............ G01J 5/0853
399/33

FOREIGN PATENT DOCUMENTS

JP S38-9798 B1 6/1963
JP 2002-156284 A 5/2002
(Continued)

OTHER PUBLICATIONS

International Search Report for PCT/JP2017/031651 dated Nov. 21, 2017.
Written Opinion for PCT/JP2017/031651 dated Nov. 21, 2017.

*Primary Examiner* — David P Porta
*Assistant Examiner* — Meenakshi S Sahu
(74) *Attorney, Agent, or Firm* — Pearne & Gordon LLP

(57) ABSTRACT

To provide an infrared temperature sensor that is corrected in detected temperature while ensuring high responsiveness. An infrared temperature sensor 10 according to the present invention includes a heat conversion film 40, an infrared detection element 43 held by the heat conversion film 40, a temperature compensation element 45 that is provided adjacently to the infrared detection element 43 and is held by the heat conversion film 40, a light guide part 59 that guides entered infrared rays toward the infrared detection element 43, and a blocking part 27 that blocks the infrared rays from being incident on the temperature compensation element 45, in which an inner surface of the light guide part 59 configures an irradiation surface 57 to be irradiated with the infrared rays, and the irradiation surface 57 includes a correction region 58 that is different in emissivity of the infrared rays from surroundings.

17 Claims, 10 Drawing Sheets

(51) Int. Cl.
   *G01J 5/08*      (2006.01)
   *G01J 5/02*      (2006.01)
(58) Field of Classification Search
   USPC .......................................................... 250/352
   See application file for complete search history.

(56) References Cited

FOREIGN PATENT DOCUMENTS

| | | |
|---|---|---|
| JP | 2011-141216 A | 7/2011 |
| JP | 2014-89108 A | 5/2014 |
| JP | 2015-172537 A | 10/2015 |
| JP | 2016-50871 A | 4/2016 |
| WO | 2010140095 A2 | 12/2010 |
| WO | 2013014707 A1 | 1/2013 |
| WO | 2013-065091 A1 | 5/2013 |

* cited by examiner

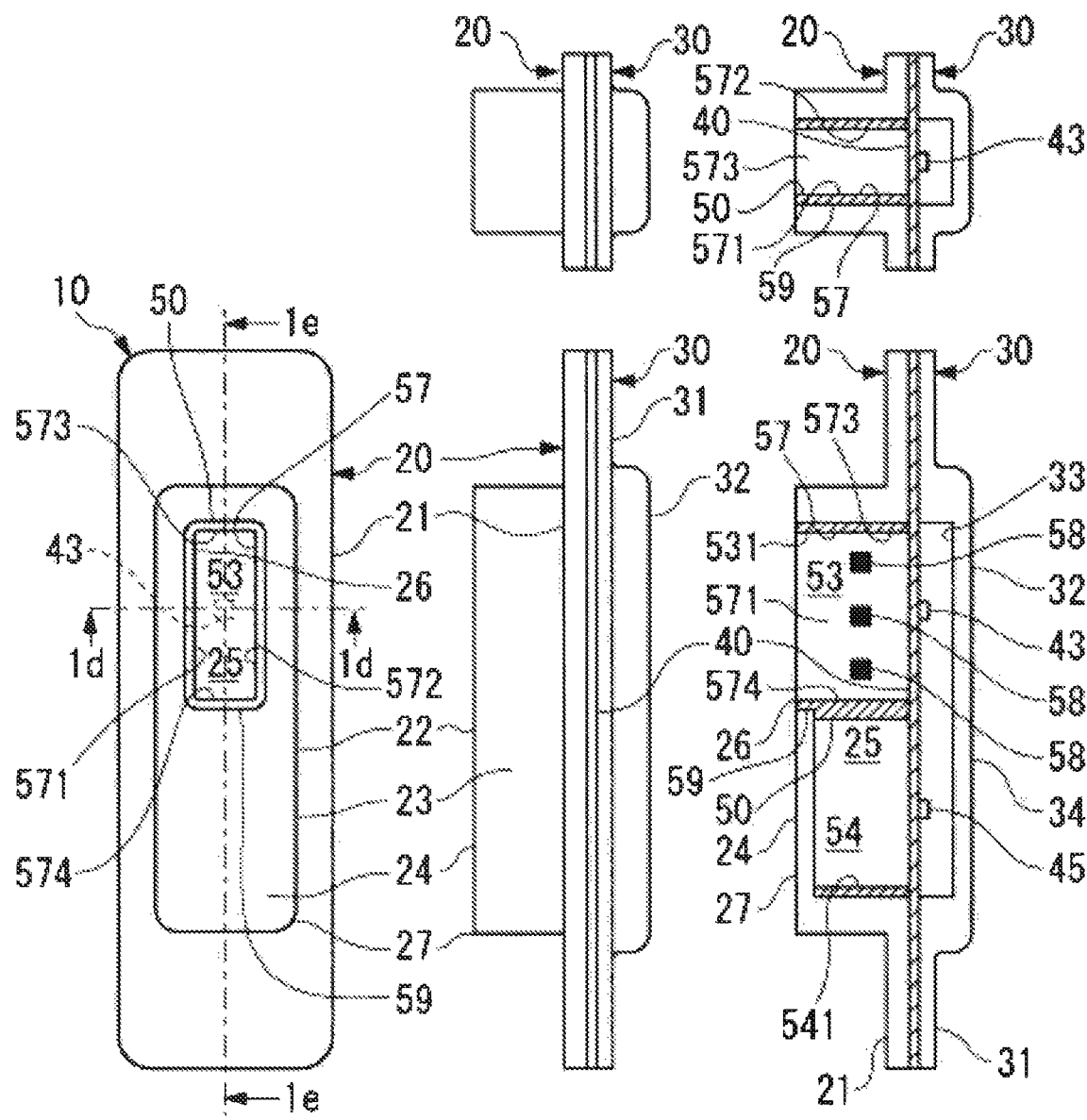

FIG. 6

| SHIFT AMOUNT ($\Delta T$) | AREA OF CORRECTION REGION | DETERMINATION |
|---|---|---|
| ⋮ | ⋮ | CORRECTION REQUIRED [DECREASE DETECTED TEMPERATURE] |
| $-\Delta T3 \geq \Delta T > -\Delta T4$ | A34 | |
| $-\Delta T2 \geq \Delta T > -\Delta T3$ | A23 | |
| $-\Delta T1 \geq \Delta T > -\Delta T2$ | A12 | |
| $0 \geq \Delta T > -\Delta T1$ | 0 | CORRECTION UNREQUIRED |

FIG. 10A
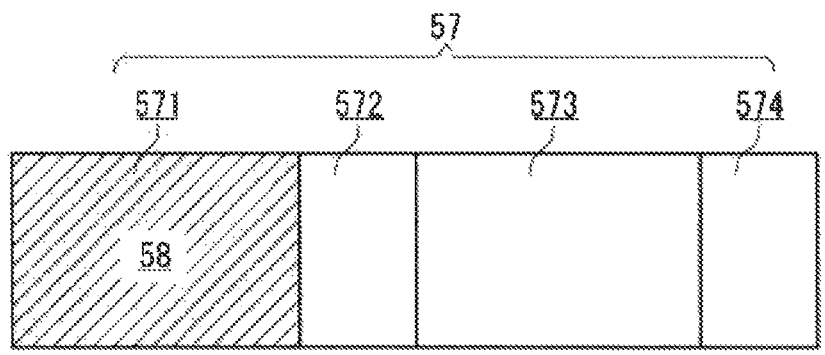
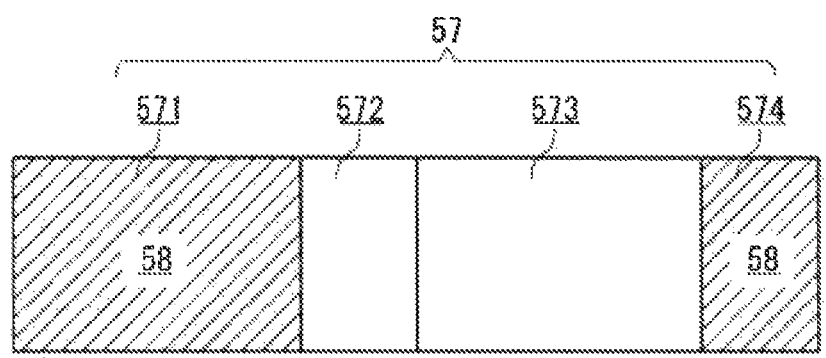
FIG. 10B
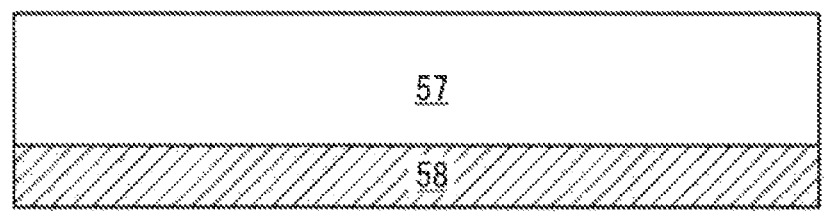
FIG. 10C
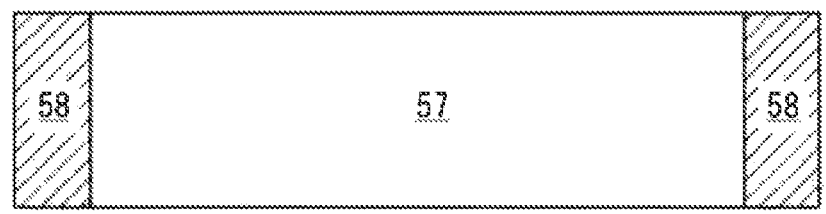
FIG. 10D

INFRARED TEMPERATURE SENSOR

This is the National Stage of PCT international application PCT/JP2017/031651 filed on Sep. 1, 2017, which claims priority from Japanese Patent Application No. 2016-246675 filed on Dec. 20, 2016, both of which are incorporated herein by reference in their entireties.

TECHNICAL FIELD

The present invention relates to an infrared temperature sensor that is used in a toner fixing unit used in an image forming apparatus such as a copier and a printer.

BACKGROUND ART

As a toner fixing unit used in an image forming apparatus, a toner fixing unit of a type in which a toner image corresponding to image information is carried and formed on a recording sheet through an operation process of an electrophotographic system, and unfixed toner is then heated and fixed while the recording sheet is moved, is commonly used.

The fixing unit sandwiches, by fixing means and pressurizing means, the recording sheet and the toner carried on the recording sheet by static electricity, moves the recording sheet and the toner while applying heat and pressure to the recording sheet and the toner, thereby melting and fixing the toner to the recording sheet. The fixing means includes a roller that conveys the recording sheet and the toner while rotating, and the pressurizing means includes a roller that rotates in a direction opposite to a direction of the roller of the fixing means while being in pressure contact with the fixing means.

Temperature of each of the rollers largely influences image quality. Therefore, the temperature of a surface of each of the rollers is detected by a sensor and is controlled.

An infrared temperature sensor that detects temperature of a roller of a fixing unit in a non-contact manner in order to avoid damage of the roller, is well-known (for example, Patent Literatures 1, 2, and 3). The infrared temperature sensor includes an infrared detection element and a temperature compensation element on a heat conversion film, detects, by the infrared detection element, an infrared radiation heat quantity of the roller that is fixing means as a detection object, further detects atmospheric temperature by the temperature compensation element to compensate the temperature, thereby specifying the temperature of the detection object.

CITATION LIST

Patent Literature

Patent Literature 1: JP 2011-141216 A
Patent Literature 2: JP 2015-172537 A
Patent Literature 3: JP 2002-156284 A
Patent Literature 4: International Publication No. WO 2013/065091

SUMMARY OF INVENTION

Technical Problem

Incidentally, the fabricated individual infrared temperature sensor includes a structural error mainly caused by dimension accuracy of components and assembling accuracy of the components. The structural error causes shift in output characteristics from the sensor, namely, detected temperature. Therefore, a plurality of fabricated infrared temperature sensors are different in the detected temperature from one another. In the above-described Patent Literatures 1 to 3, a mechanical element that adjusts or corrects the shift of the detected temperature after completion of the infrared temperature sensor, such as a screw and a sliding mechanism is additionally provided. As a result, in the Patent Literatures 1 to 3, an opening area or a visual field area of a sensor case that takes in infrared rays is reduced from an initial area to eliminate the shift of the detected temperature.

In the propositions in Patent Literatures 1 to 3, however, a workload is large and a cost is increased because the mechanical element is additionally provided to reduce the visual field area.

Accordingly, Patent Literature 4 proposes providing of a coating film that adjusts infrared absorptance, on a surface of the heat conversion film. According to the proposition, providing the coating film makes it possible to adjust the infrared absorptance as the entire heat conversion film, and to correct the detected temperature of the infrared temperature sensor. Further, providing the coating film on the heat conversion film is easy in working as compared with addition of the mechanical element and suppresses the cost.

Providing the coating film, however, increases an apparent volume of the heat conversion film, which increases heat capacity. Therefore, responsiveness of the temperature detection is impaired. Accordingly, the proposition in Patent Literature 4 is not adaptable to an application requiring extremely high responsiveness in some cases.

Accordingly, an object of the present invention is to provide an infrared temperature sensor that makes it possible to correct detected temperature while securing high responsiveness.

Solution to Problem

The present invention relates to an infrared temperature sensor that detects temperature of a detection object in a non-contact manner according to infrared rays radiated from the detection object, the infrared temperature sensor configured to be used so as to be disposed facing the detection object. The infrared temperature sensor according to the present invention includes a heat conversion film configured to be irradiated with the infrared rays radiated from the detection object and to convert the incident infrared rays into heat, a blocking part disposed facing the heat conversion film, and configured to block the infrared rays radiated from the detection object, from being incident on a part of the heat conversion film, an infrared detection element that is held in a region of the heat conversion film irradiated with the infrared rays radiated from the detection object, a temperature compensation element that is held in a region of the heat conversion film blocked from the infrared rays by the blocking part, and a light guide part including an irradiation surface and configured to guide the infrared rays radiated from the detection object to the region where the infrared detection element is provided.

In the infrared temperature sensor according to the present invention, the irradiation surface includes a correction region that is different in emissivity of the infrared rays from another region.

The emissivity indicates a ratio of energy emitted from a surface of a substance at certain temperature and energy emitted from a black body at the same temperature.

According to the infrared temperature sensor of the present invention, it is possible to correct the detected temperature by forming the correction region on the irradiation surface without adding any modification to the heat conversion film. This makes it possible to correct the detected temperature while securing high responsiveness. In addition, formation of the correction region is performed with small workload at low cost as compared with addition of a mechanical element.

In the present invention, as a mode in which the emissivity of the infrared rays of the correction region is different from that of the other region, the correction region is higher or lower in the emissivity of the infrared rays than the other region in the irradiation surface. Further, the mode includes at least the following two modes.

In a first mode, the correction region is larger or smaller in surface roughness than the other region in the irradiation surface.

In a second mode, the correction region includes a coating film or a sheet member that is higher or lower in the emissivity of the infrared rays than the other region in the irradiation surface.

As described above, in the infrared temperature sensor according to the present invention, it is possible to select whether to make the emissivity of the infrared rays of the correction region higher or lower than that of the other region in the irradiation surface. Accordingly, it is possible to adapt both of increase correction and decrease correction of the detected temperature of the temperature sensor. In other words, if the correction increasing the detected temperature is necessary, it is sufficient to decrease the emissivity of the infrared rays in the correction region. If the correction decreasing the detected temperature is necessary, it is sufficient to increase the emissivity of the infrared rays in the correction region.

The correction region in the first mode is preferably formed through supply of energy from outside. The energy from outside may be supplied through application of a laser beam.

The supply of the energy from outside is easy in working as compared with addition of a mechanical element without being limited to the example of application of the laser beam. Therefore, it is possible to easily correct the detected temperature.

The irradiation surface in the temperature sensor according to the present invention includes at least two modes.

A first mode corresponds to a case where the irradiation surface is partitioned into a plurality of irradiation surfaces, and a second mode corresponds to a case where the irradiation surface includes a single continuous surface.

In the first mode, the correction region is provided on at least one of the partitioned irradiation surfaces. In the first mode, four inner surfaces of a square-cylindrical light guide part are typically corresponded.

In the first mode, the correction region may be provided on a whole or a part of one of the partitioned irradiation surfaces.

In the second mode, the correction region may be provided on a part of the single surface.

In a case where the correction region is provided on a part of the irradiation surface in the first mode and in a case where the correction region is provided on a part of the irradiation surface in the second mode, the other region may be provided around the correction region.

Further, although a shape of the light guide part of the infrared temperature sensor in the invention of the present application is optional as long as the purpose is achieved, the light guide part may have a cylindrical shape or a plate shape.

In a case where the light guide part has the cylindrical shape, the irradiation surface may be provided on an inner surface of the cylindrical light guide part. A cylinder or a square cylinder is adopted to the cylindrical light guide part.

In a case where the light guide part has the plate shape, the irradiation surface is provided on at least one of front and rear surfaces of the plate-like light guide part. A plurality of plate-like light guide parts may be combined in a gate shape in a planar view, in addition to a single simple plate-like light guide part.

The infrared temperature sensor according to the present invention may further include a first case and a second case disposed facing the first case. The first case includes the blocking part and the light guide part, and the first case and the second case sandwich the heat conversion film. The second case preferably includes a housing concave part housing the infrared detection element and the temperature compensation element that are held on a surface of the heat conversion film on a side opposite to the detection object.

The irradiation surface and the correction region may be provided directly on the light guide part of the second case, or on an infrared absorbing molded body that is configured to be attached to the light guide part of the second case.

The above-described infrared temperature sensor is manufactured by the following method of manufacturing the infrared temperature sensor. The method includes a determination step of determining necessity of correction for an inspection object sensor, based on prescribed temperature Tr and actually-measured temperature Ta that is acquired by actually performing temperature detection with use of the inspection object sensor, and a correction step of forming, on the irradiation surface of the inspection object sensor, the correction region that is different in emissivity of the infrared rays from surroundings, based on a result of the determination in the determination step.

According to the manufacturing method, only the inspection object sensor requiring correction is picked up. This makes it possible to efficiently manufacture the infrared temperature sensor subjected to necessary correction.

Advantageous Effects of Invention

According to the infrared temperature sensor of the present invention, the correction region is formed on the irradiation surface to correct the detected temperature without adding any modification to the heat conversion film. This makes it possible to correct the detected temperature while securing high responsiveness. In addition, formation of the correction region is performable with small workload and low cost as compared with addition of a mechanical element.

BRIEF DESCRIPTION OF DRAWINGS

FIGS. 1A to 1E are diagrams each illustrating an infrared temperature sensor according to the present embodiment, FIG. 1A being a front view, FIG. 1B being a plan view, FIG. 1C being a side view, FIG. 1D being a cross-sectional view taken along a line 1d-1d of FIG. 1B, and FIG. 1E being a cross-sectional view taken along a line 1e-1e of FIG. 1B.

FIG. 6 is a table illustrating an example of correction data in which a shift amount and an area of the correction region determined according to the shift amount are associated with each other.

FIG. 10 is a diagram illustrating an example of the correction region.

DESCRIPTION OF EMBODIMENT

An embodiment of the present invention is described below with reference to accompanying drawings.

Figure 9A:
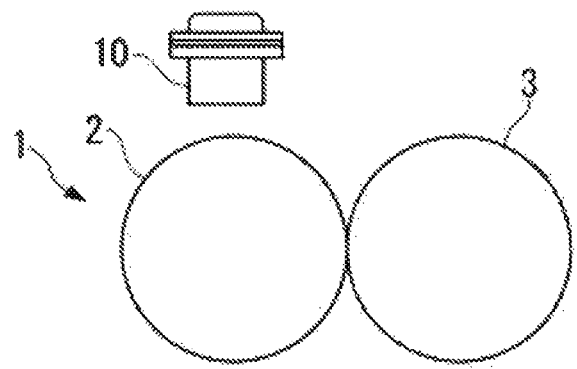
FIGS. 9A and 9B each illustrate a schematic configuration of a fixing unit according to an embodiment, FIG. 9A being a front view, and FIG. 9B being a side view.
Figure 9B:
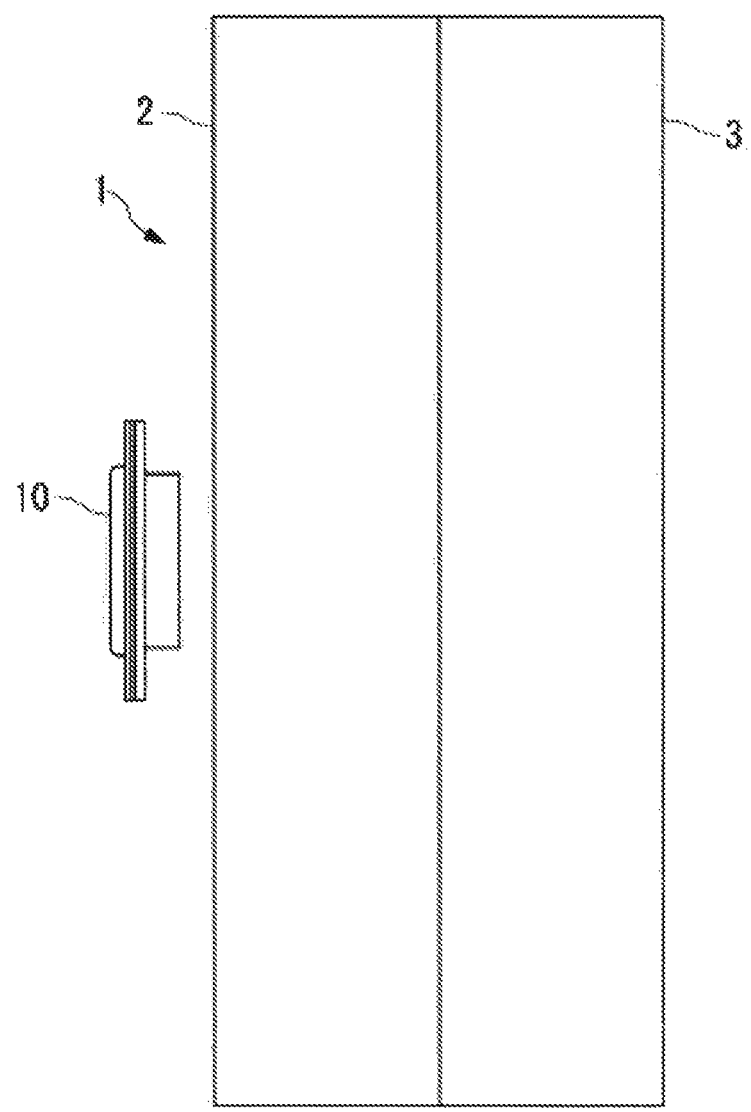

For example, as illustrated in FIG. 9, a temperature sensor 10 detects temperature of a roller 2 as a detection object in a non-contact manner by detecting infrared rays radiated from the roller 2 by an infrared detection element 43 and performing temperature compensation through detection of atmospheric temperature by a temperature compensation element 45. The roller 2 is fixing means of a toner fixing unit 1 used in an image forming apparatus such as a copier and a printer.

The toner fixing unit 1 includes the roller 2 as the fixing means, and a roller 3 as pressurizing means. Note that the temperature of the roller 3 as the pressurizing means may be detected by the temperature sensor 10. In addition, in the present embodiment, side facing the detection object is defined as front (front side).

The infrared temperature sensor 10 (hereinafter, simply referred to as temperature sensor 10) includes a first case 20, a second case 30 assembled to rear side of the first case 20, and a heat conversion film 40 (hereinafter, simply referred to as film 40) sandwiched between the first case 20 and the second case 30 as illustrated in FIGS. 1A to 1C, and includes the infrared detection element 43 held by the film 40 and the temperature compensation element 45 held by the film 40 as illustrated in FIGS. 1D and 1E. The infrared detection element 43 and the temperature compensation element 45 are held on a surface of the film 40 on a side opposite to the roller 2 as the detection object.

The temperature sensor 10 has been corrected in shift of the detected temperature through formation of a correction region 58 where emissivity is different from emissivity of other surrounding region because it was confirmed that the shift occurs on the detected temperature after the temperature sensor 10 has been manufactured as a product.

[First Case 20]

As illustrated in FIGS. 1A to 1C, the first case 20 includes a base part 21, a body part 22, and an infrared absorbing molded body 50. The base part 21 has a rectangular planar shape. The body part 22 has a rectangular parallelepiped outer shape projecting forward from the base part 21. The infrared absorbing molded body 50 is attached inside the first case 20. The base part 21 and the body part 22 of the first case 20 are integrally formed of a metal material with high thermal conductivity, such as aluminum and copper. The metal material with high thermal conductivity is a desirable mode; however, the present invention is not limited thereto. This is true of the second case 30.

The body part 22 includes a side wall 23 standing on the base part 21, and an upper wall 24 provided at a front end of the side wall 23. The body part 22 includes an air gap 25 inside thereof. The air gap 25 has a rectangular parallelepiped shape that is substantially similar to the shape of the body part 22.

Rear end side of the air gap 25 penetrates through the first case 20 (base part 21). A part of the air gap 25 penetrates through the upper wall 24 through an infrared entrance window 26 on the front end side whereas the other parts of the air gap 25 are closed by the upper wall 24. The infrared entrance window 26 is open in a rectangular shape in the upper wall 24.

As illustrated in FIG. 1E, the infrared absorbing molded body 50 is attached to the air gap 25 of the first case 20.

Figures 2A, 2B:
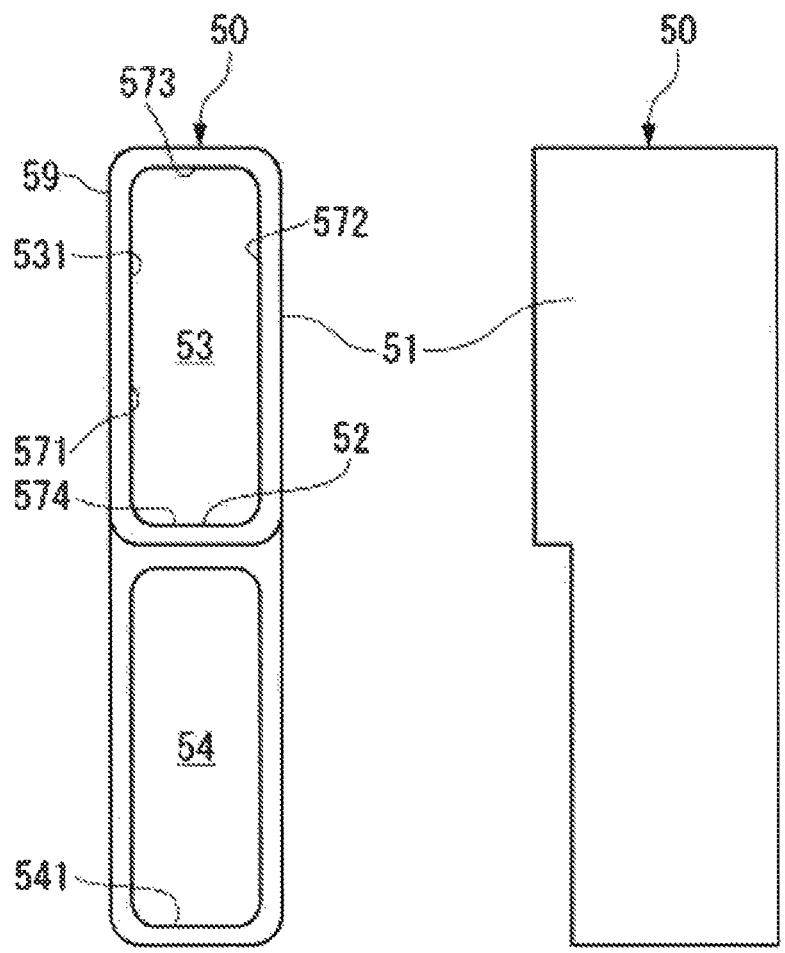
FIGS. 2A and 2B each illustrate an infrared absorbing molded body to be assembled to the infrared temperature sensor according to the present embodiment, FIG. 2A being a plan view, and FIG. 2B being a side view.

As illustrated in FIG. 2A, the infrared absorbing molded body 50 has a rectangular parallelepiped outer shape, and includes a peripheral wall 51 forming an outer periphery. Further, the infrared absorbing molded body 50 includes a first air gap 53 and a second air gap 54 that are surrounded by the peripheral wall 51 and partitioned by a partition wall 52. The first air gap 53 and the second air gap 54 penetrate in a height direction, or in a front-rear direction in a state where the infrared absorbing molded body 50 is disposed inside the body part 22, and are substantially symmetrical about the partition wall 52. As illustrated in FIG. 2B, a part of the peripheral wall 51 corresponding to the first air gap 53 projects forward relative to a part corresponding to the second air gap 54.

The infrared absorbing molded body 50 with the above-described configuration is attached inside the body part 22 of the first case 20. As illustrated in FIG. 1E, in the air gap 25 of the body part 22, the first air gap 53 of the infrared absorbing molded body 50 is disposed on a region side penetrating through the upper wall 24 through the infrared entrance window 26, and the second air gap 54 is disposed on the side closed by the upper wall 24 in the air gap 25 of the body part 22. With reference to the infrared detection element 43 and the temperature compensation element 45, the first air gap 53 is disposed on the side corresponding to the infrared detection element 43, and the second air gap 54 is disposed on the side corresponding to the temperature compensation element 45. The infrared absorbing molded body 50 includes a square-cylindrical light guide part 59 through which the infrared rays entered through the infrared entrance window 26 passes. The light guide part 59 is formed by the peripheral wall 51 and the partition wall 52 that surround the first air gap 53.

The infrared rays to be irradiated from the roller 2 toward the temperature sensor 10 are taken through the infrared entrance window 26, pass through the first air gap 53 toward the rear end side, and irradiate the film 40. In process of the passage, the infrared rays are partially incident on an inner surface 531 of the light guide part 59 surrounding the first air gap 53, and infrared rays radiated from the inner surface 531 are also incident on the film 40. The route through which the infrared rays pass through the light guide part 59 becomes a light guide path.

In other words, as illustrated in FIGS. 1B, 1D, and 1E, an irradiation surface 57 that is irradiated with a part of the infrared rays entering through the infrared entrance window 26, and radiates the incident infrared rays to cause a part of the radiated infrared rays to reach the film 40, is formed on the inner surface 531 communicating with the infrared entrance window 26. In contrast, an inner surface 541 surrounding the second air gap 54 does not configure the irradiation surface 57. A blocking part 27 that blocks the infrared rays from being incident on the temperature compensation element 45, is configured by the upper wall 24 of the body part 22 and the peripheral wall 51 and the partition wall 52 that surround the second air gap 54.

As illustrated in FIG. 1B, the irradiation surface 57 has a square shape surrounding the light guide path in a planar view, and includes a first irradiation surface 571, a second irradiation surface 572, a third irradiation surface 573, and a fourth irradiation surface 574. The first irradiation surface 571 and the second irradiation surface 572 face each other, and the third irradiation surface 573 and the fourth irradiation surface 574 are orthogonal to the first irradiation surface 571 and the second irradiation surface 572.

Note that the infrared rays irradiated from the roller 2 toward the temperature sensor 10 are also incident on the side wall 23 and the upper wall 24 of the body part 22, and the base part 21 that form the first case 20.

As illustrated in FIG. 1E, the temperature sensor 10 includes, in the first irradiation surface 571, a correction region 58 where emissivity of the infrared rays is different from that of a surrounding region. The correction region 58 may be provided on one or two or more of the first irradiation surface 571, the second irradiation surface 572, the third irradiation surface 573, and the fourth irradiation surface 574 without being limited to the first irradiation surface 571. Forming the correction region 58 in only one surface, however, makes it possible to reduce a workload as compared with a case where the correction region 58 is formed on a plurality of surfaces.

The correction region 58 includes surface roughness that is larger than that of the surrounding first irradiation surface 571. When the surface roughness of the correction region 58 is large, emissivity of the infrared rays of the correction region 58 becomes higher than that of the first irradiation surface 571. Therefore, providing the correction region 58 reduces an amount of the infrared rays reaching the film 40. This makes it possible to decrease the detected temperature of the temperature sensor 10 as compared with the detected temperature before formation of the correction region 58.

As described later, the correction region 58 is formed through application of a laser beam to a part of the first irradiation surface 571. Application of the laser beam increases the surface roughness as compared with the surface roughness before application.

As illustrated in FIG. 1E, the correction region 58 includes, for example, a square shape that has been formed through application of the laser beam to a region occupied by the square shape. In this case, an example in which three correction regions 58 are arranged with the same height is illustrated; however, the shape, a dimension, and an arrangement of the correction region 58 are optional as long as the emissivity of the infrared rays are enhanced by a necessary amount.

Figure 3:
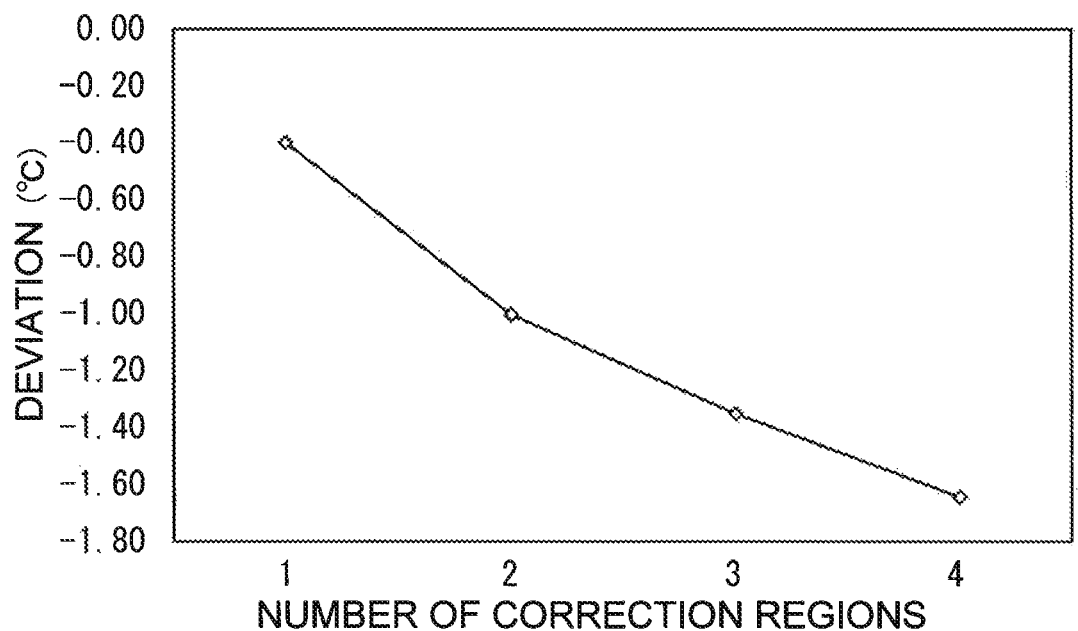
FIG. 3 is a graph illustrating relationship between number of correction regions and detected temperature.

The corrected amount of the detected temperature of the temperature sensor 10 by formation of the correction region 58 is controlled by the area of the correction region 58 to the irradiation surface. FIG. 3 illustrates deviation between the detected temperature of the temperature sensor 10 before correction and the detected temperature of the temperature sensor 10 after correction. The correction is performed in such a manner that the rectangular correction region 58, a length of one side of which is 2 mm, is formed through laser beam irradiation and the number of the correction regions 58 is changed. It was found from a result illustrated in FIG. 3 that the corrected amount of the detected temperature of the temperature sensor 10 is controllable by the size of the area of the correction region 58 to the irradiation surface.

[Second Case 30]

As illustrated in FIGS. 1C and 1E, the second case 30 includes a base part 31 having a rectangular planar shape, and an element housing part 32 projecting rearward from the base part 31.

The base part 31 has the shape and the size substantially same as those of the base part 21 of the first case 20. Further, the first case 20 and the second case 30 are positioned such that a peripheral edge of the base part 21 and a peripheral edge of the base part 31 are coincident with each other, and are bonded to each other with the film 40 in between.

The element housing part 32 includes a housing concave part 33 that is open on the front end side. The infrared detection element 43 and the temperature compensation element 45 that are held by the film 40 are disposed facing the housing concave part 33. The infrared detection element 43 and the temperature compensation element 45 are prevented by the housing concave part 33 from being directly contacted with a bottom floor 34 of the element housing part 32. In other words, the air contained in the housing concave part 33 functions as a heat-insulating layer, and minimizes thermal influence from the outside, in particular, from the rear side of the temperature sensor 10, to the infrared detection element 43 and the temperature compensation element 45. In the present invention, providing of the heat-insulating layer of the air is a desirable mode; however, a mode in which the infrared detection element 43 and the temperature compensation element 45 come into direct contact with the second case 30 is not excluded.

[Film 40]

The infrared detection element 43 and the temperature compensation element 45 are disposed on a rear surface of the film 40 that is one of surfaces, and the film 40 is electrically connected to an unillustrated wiring pattern. Note that an external lead terminal is provided on a terminal end of the wiring pattern; however, illustration and description of the configuration are omitted because the configuration is well-known by those skilled in the art.

The film 40 contains a resin of a high polymer material. The material of the resin is not limited as long as the material absorbs infrared rays, and well-known resins such as polyphenylene sulfide, polyimide, polyester, and polyethylene may be used. Further, a material other than the resin may be used as long as the material absorbs infrared rays.

[Infrared Detection Element 43 and Temperature Compensation Element 45]

The infrared detection element 43 detects temperature increase caused by heat that is generated when the infrared rays radiated from the surface of the roller 2 are absorbed by the film 40, and the temperature compensation element 45 detects atmospheric temperature. Note that thermosensitive elements with substantially equivalent temperature characteristics are used for the infrared detection element 43 and the temperature compensation element 45.

Further, as the infrared detection element 43 and the temperature compensation element 45, a small resistor including a temperature coefficient, such as a thin film thermistor and a platinum temperature sensor, may be widely used, and the infrared detection element 43 and the temperature compensation element 45 are not limited to particular materials and shapes.

The infrared detection element 43 and the temperature compensation element 45 are preferably disposed at respective positions line-symmetrical about a center of the film 40 in a longitudinal direction.

[Temperature Sensor 10]

As illustrated in FIGS. 1C and 1E, the first case 20 and the second case 30 of the temperature sensor 10 are positioned such that the peripheral edge of the base part 21 and the peripheral edge of the base part 31 are coincident with each other, and are bonded to each other with the heat conversion film 40 in between.

The components configuring the temperature sensor 10, such as the first case 20 and the second case 30, however, are varied in dimension, and variation also occurs when the components are assembled. These variation appears as a shift of the detected temperature of the temperature sensor 10. Therefore, to correct the shift of the detected temperature to detect target original temperature after fabrication of the temperature sensor 10, the correction region 58 is provided on the first irradiation surface 571 as illustrated in FIG. 1E in the present embodiment.

In other words, the temperature sensor 10 according to the present embodiment has been corrected in the detected temperature through correction, by the correction region 58, of the emissivity of the infrared rays incident on the first irradiation surface 571.

Note that, although illustration is omitted, the temperature sensor 10 includes a temperature detection circuit. The detection circuit is optional, and a well-known detection circuit may be used as the detection circuit. Further, a procedure of temperature detection is also optional and a well-known procedure may be used as the procedure of temperature detection.

[Method of Manufacturing Temperature Sensor 10]

Next, a method of manufacturing the temperature sensor 10 according to the present embodiment is described.

The temperature sensor 10 is manufactured through a manufacturing process and a subsequent formation process. In the manufacturing process, the temperature sensor 10 excluding the correction region 58 (inspection object sensor 10*i*) is manufactured. In the formation process, whether to provide the correction region 58 in the temperature sensor 10 is determined and a specification when the correction region 58 is provided is determined, and the correction region 58 is then formed.

In other words, the correction region 58 is formed in a case where the correction of the detected temperature is necessary after the temperature sensor 10 excluding the correction region 58 is fabricated. Accordingly, there is the temperature sensor 10 without the correction region 58 even after the series of manufacturing processes. In addition, even if the correction region 58 is provided, the area of the provided correction region 58 is different between the temperature sensors 10 because the specification of the correction region 58 is determined according to the correction degree required for the temperature sensor 10.

Therefore, to determine whether to provide the correction region 58 and the specification when the correction region 58 is provided, the formation process in which the detected temperature of the individual temperature sensor 10 is inspected and the correction region 58 is formed based on a result of the inspection is necessary after the temperature sensor 10 is fabricated.

In the following, a line performing the formation process according to the present embodiment is described with reference to FIG. 5, and the procedure of the formation process according to the present embodiment is thereafter described with reference to FIG. 7.

Note that the inspection object sensor 10*i* as an inspection object includes the configuration same as the temperature sensor 10 except that the inspection object sensor 10*i* does not include the correction region 58.

[Inspection-Correction Line 70]

Figure 5:
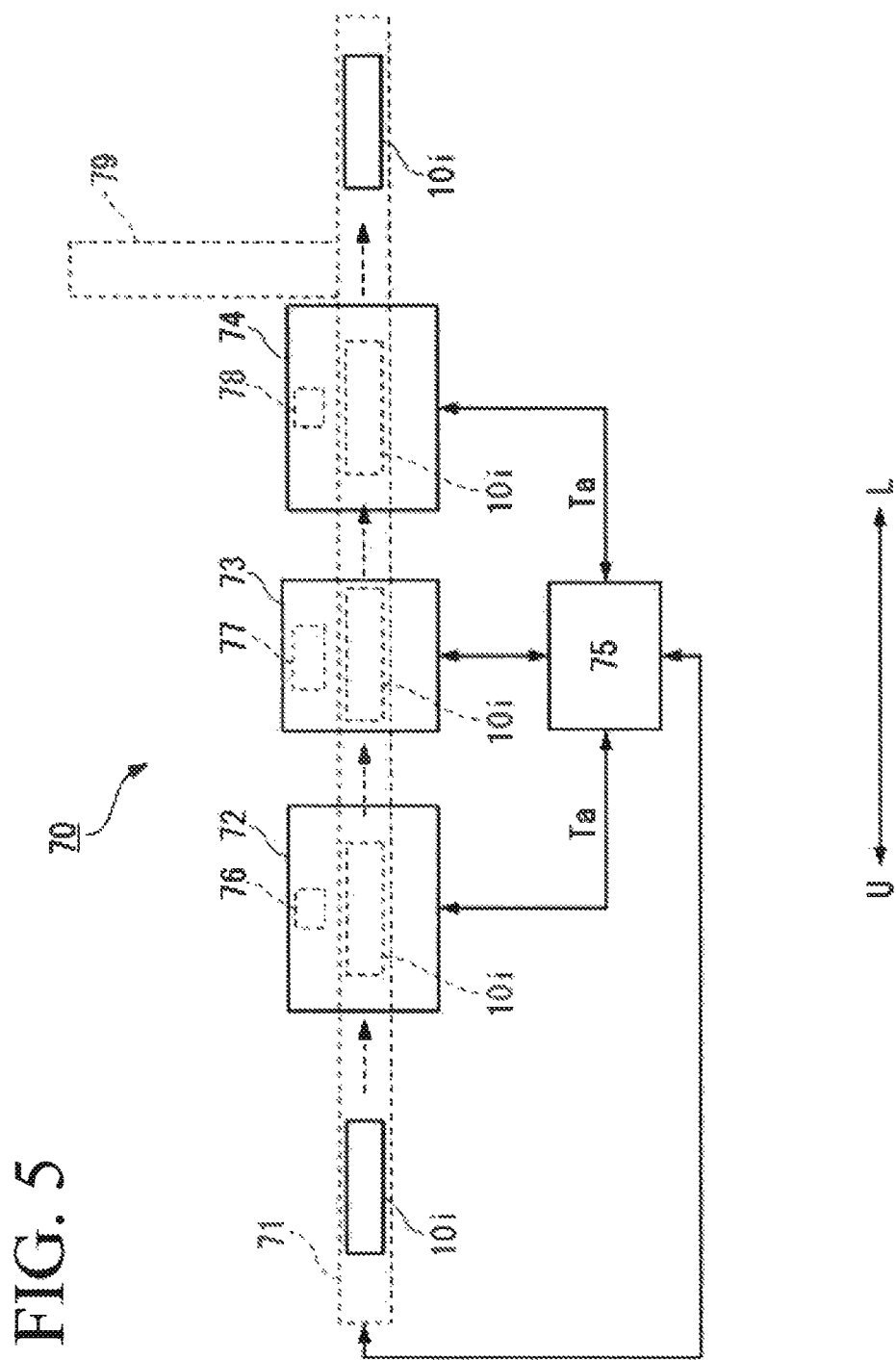
FIG. 5 is a block diagram illustrating a schematic configuration of a line that inspects and corrects the detected temperature of the infrared temperature sensor according to the present embodiment.

As illustrated in FIG. 5, the formation process is performed by an inspection-correction line 70 through which the inspection object sensor 10*i* is conveyed along a conveyance path 71.

The inspection-correction line 70 includes the conveyance path 71, a first inspection section 72, a correction section 73, a second inspection section 74, and a control section 75. The conveyance path 71 includes, for example, a belt conveyer that conveys the inspection object sensor 10*i* from upstream side U toward downstream side L in the figure. The first inspection section 72, the correction section 73, and the second inspection section 74 are disposed in order from the upstream side U on the conveyance path 71.

[First Inspection Section 72]

The first inspection section 72 actually performs temperature detection with use of the inspection object sensor 10*i*, and acquires an actually-measured temperature Ta.

To acquire the actually-measured temperature Ta, the first inspection section 72 includes a prescribed value heater 76. The inspection object sensor 10*i* conveyed to the first inspection section 72 detects radiant heat energy from the prescribed value heater 76 to acquire the actually-measured temperature Ta. Note that temperature of the prescribed value heater 76 at this time is denoted by Tr. The actually-measured temperature Ta (data) by the inspection object sensor 10*i* is transmitted from the first inspection section 72 to the control section 75.

[Correction Section 73]

The correction section 73 forms the correction region 58 in the first irradiation surface 571, based on a shift amount (Tr−Ta; hereinafter, simply referred to as shift amount in some cases) between the actually-measured temperature Ta of the inspection object sensor 10*i* and the prescribed temperature Tr.

The correction section 73 includes a laser marking machine 77 that controls an irradiation region of a laser beam with high accuracy, in order to form the correction region 58. The laser marking machine 77 applies the laser beam within a predetermined area range to a predetermined position of the first irradiation surface 571 in response to an instruction from the control section 75, thereby forming the correction region 58. The predetermined area to which the laser beam is applied is determined by the control section 75 based on the shift amount between the actually-measured temperature Ta and the prescribed temperature Tr, and is instructed to the correction section 73.

When the shift amount (Tr−Ta) of the inspection object sensor 10*i* is equal to or less than a threshold, the correction section 73 does not form the correction region 58 in the inspection object sensor 10*i*. Accordingly, the inspection object sensor 10*i* just passes through the correction section 73. The procedure is also performed based on an instruction from the control section 75.

[Second Inspection Section 74]

The second inspection section 74 acquires the actually-measured temperature Ta with use of the inspection object sensor 10i in which the correction region 58 has been formed by the correction section 73 or the inspection object sensor 10i in which the correction region 58 has not been formed, in a manner similar to the first inspection section 72.

The second inspection section 74 includes a prescribed value heater 78, detects the actually-measured temperature Ta with use of the inspection object sensor 10i, and transmits the data to the control section 75, as with the first inspection section 72. Note that temperature of the prescribed value heater 78 at this time is also denoted by Tr.

[Control Section 75]

The control section 75 controls operation of each of the components in the inspection-correction line 70.

The control section 75 is mutually coupled to each of the conveyance path 71, the first inspection section 72, the correction section 73, and the second inspection section 74 through electric communication means. Accordingly, for example, the control section 75 receives the data of the detected actually-measured temperature Ta from the first inspection section 72, and transmits, to the correction section 73, an instruction of formation of the correction region 58 corresponding to the shift amount that is calculated based on the received data.

The control section 75 holds data relating to the prescribed temperature Tr for calculation of the shift amount. When receiving the actually-measured temperature Ta from the first inspection section 72, the control section 75 calculates a shift amount $\Delta T$ ($\Delta T = Tr - Ta$) with the holding prescribed temperature Tr. The control section 75 similarly calculates the shift amount in a case where the actually-measured temperature Ta is received from the second inspection section 74.

The control section 75 also holds correction data in which the calculated shift amount and the formation area of the correction region 58 determined according to the shift amount are associated with each other.

FIG. 6 illustrates an example of the correction data. The example of FIG. 6 illustrates a case where the shift amount $\Delta T$ becomes a negative value because the actually-measured temperature Ta is higher than the prescribed temperature Tr. If the actually-measured temperature Ta is coincident with the prescribed temperature Tr, the shift amount becomes zero as a matter of course, and the association is also included in the correction data.

In addition, the shift amount is categorized to a predetermined range, and the area of the correction region 58 is specified according to the categorized shift amount.

Some examples for FIG. 6 are described. In a case where the shift amount is within a range of $0 \geq \Delta T > -\Delta T1$, the formation area of the correction region 58 is "0" (zero). This indicates that the correction is unnecessary because the shift amount is small in the range of $0 \geq \Delta T > -\Delta T1$. In this case, the control section 75 transmits, to the correction section 73, an instruction indicating that application of the laser beam is unnecessary because the correction is unnecessary for the inspection object sensor 10i. In other words, the range of $0 \geq \Delta T > -\Delta T1$ as the shift amount serves as a threshold to determine that the inspection object sensor 10i is an accepted product requiring no correction.

In contrast, the shift amount within a range of $-\Delta T1 \geq \Delta T > -\Delta T2$ is associated with the area of the correction region 58 of A12. In this case, the control section 75 transmits, to the correction section 73, an instruction indicating that the correction for the inspection object sensor 10i is necessary and the formation area of the correction region 58 is A12.

[Formation Process of Correction Region 58]

Next, the procedure of inspecting and correcting the inspection object sensor 10i by the above-described inspection-correction line 70 is described with reference to FIG. 7. The formation process includes a feeding process of the inspection object sensor 10i, a first inspection process, a correction process, a second inspection process, and an acceptance determination process.

Figure 7:
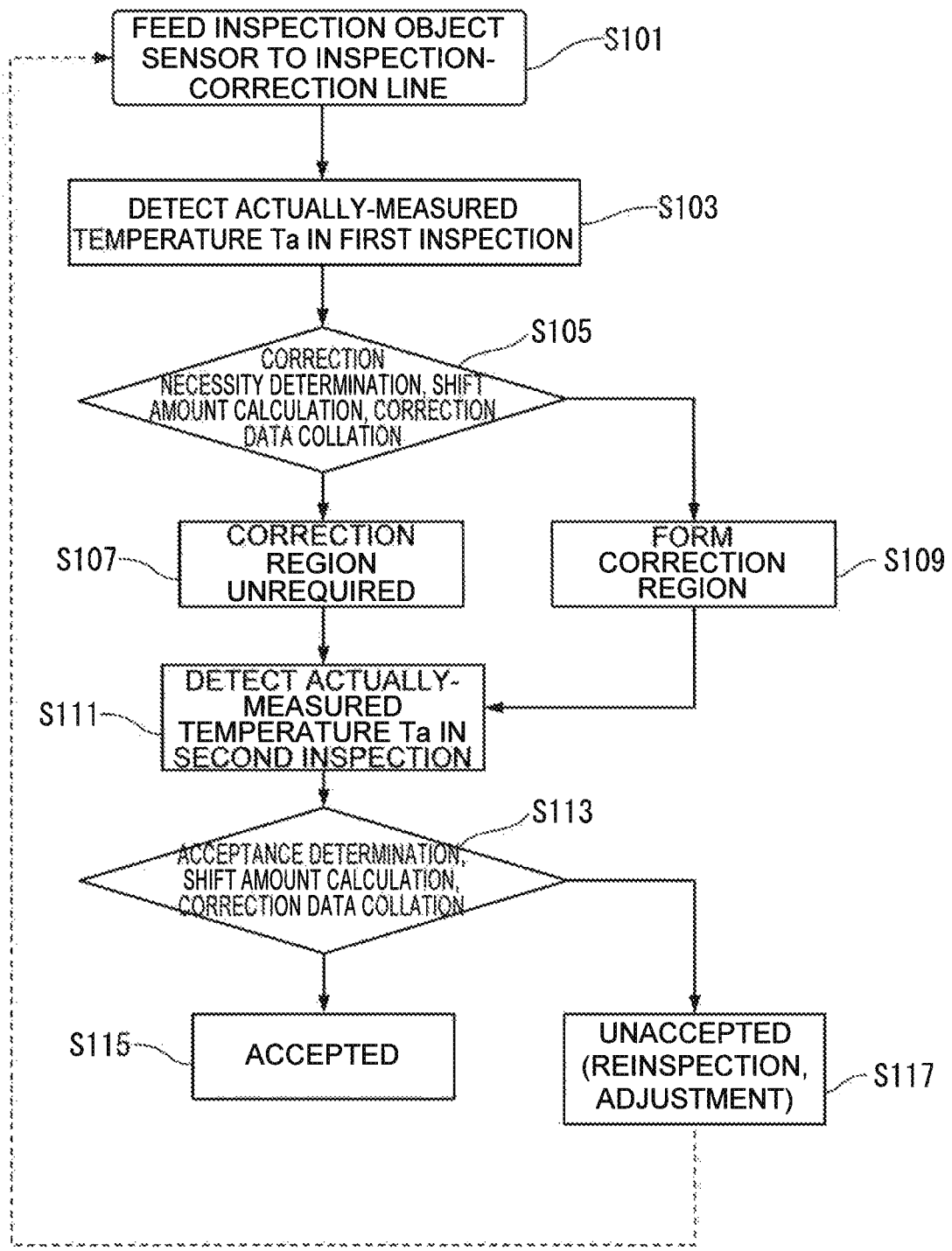
FIG. 7 is a flowchart illustrating a procedure of inspecting and correcting the detected temperature of the infrared temperature sensor according to the present embodiment.

[Feeding Process of Inspection Object Sensor 10i, Step S101 in FIG. 7]

The process is to feed the inspection object sensor 10i to the inspection-correction line 70.

More specifically, the inspection object sensor 10i is placed on the conveyance path 71 on the upstream side from the first inspection section 72. The inspection object sensor 10i is conveyed to the first inspection section 72, the correction section 73, and the second inspection section 74 in order through the conveyance path 71. The control section 75 controls conveyance speed including intermittent conveyance stop/conveyance restart of the conveyance path 71. Note that the inspection object sensor 10i is inspected and corrected by the first inspection section 72, the correction section 73, and the second inspection section 74. Therefore, the control section 75 controls operation of the conveyance path 71 so as to stop the inspection object sensor 10i at that sections.

Figure 8A:
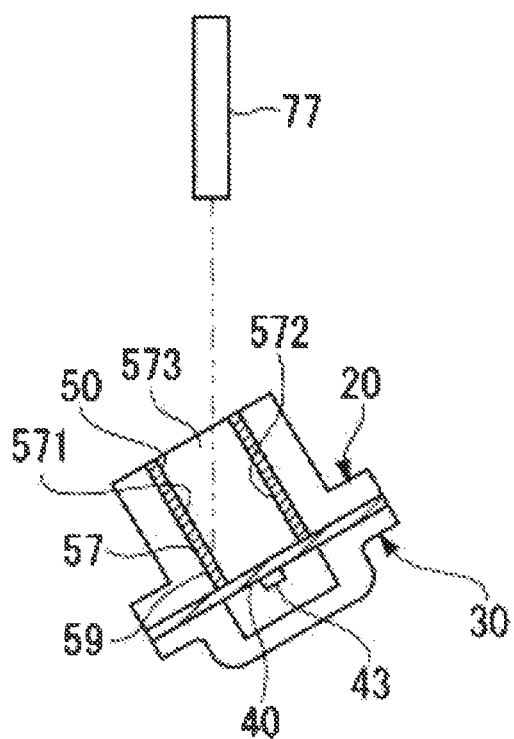
FIG. 8 is an explanatory diagram illustrating a state of arrangement of an inspection object sensor in a feeding process.
Figure 8B:
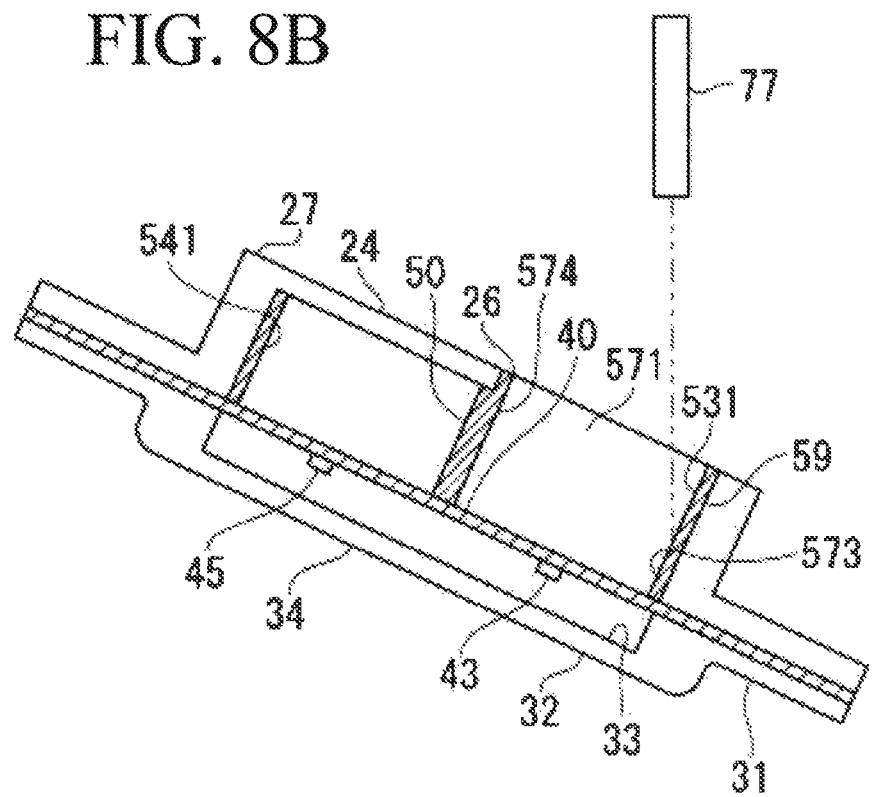

The inspection object sensor 10i used in the process is conveyed in an inclined state such that the irradiation surface 57 to be provided with the correction region 58 is irradiated with the laser beam in the correction process described later. In other words, to form the correction region 58 in the first irradiation surface 571 as with the present embodiment, the inspection object sensor 10i is conveyed in the inclined state allowing the first irradiation surface 571 to be irradiated with the laser beam as illustrated in FIG. 8A. In contrast, in a case where the correction region 58 is formed on the third irradiation surface 573, the inspection object sensor 10i is conveyed in an inclined state allowing the third irradiation surface 573 to be irradiated with the laser beam as illustrated in FIG. 8B.

[First Inspection Process, Step S103 in FIG. 7]

The process is to detect the actually-measured temperature Ta with use of the inspection object sensor 10i.

More specifically, when the inspection object sensor 10i arrives the first inspection section 72, the control section 75 instructs the first inspection section 72 to detect the actually-measured temperature Ta with use of the inspection object sensor 10i. The detection of the actually-measured temperature Ta is performed by heating an inspection environment to the prescribed temperature Tr by the prescribed value heater 76 as described above. The first inspection section 72 transmits the detected actually-measured temperature Ta to the control section 75.

When acquiring the actually-measured temperature Ta, the control section 75 operates the conveyance path 71 to move the inspection object sensor 10i to the correction section 73.

[Correction Necessity Determination Process, Step S105 in FIG. 7]

The process is to determine whether the correction of the detected temperature of the inspection object sensor 10i is necessary, based on the prescribed temperature Tr and the actually-measured temperature Ta detected by the inspection object sensor 10i in the first inspection process.

More specifically, the control section 75 first calculates the shift amount ΔT (Tr−Ta) of the inspection object sensor 10i from the actually-measured temperature Ta acquired from the first inspection section 72 and the holding prescribed temperature Tr.

Next, the control section 75 collates the calculated shift amount ΔT with the correction data illustrated in FIG. 6 to specify the area of the correction region 58 necessary for correction.

In a case where the formation area of the correction region 58 necessary for correction is "0" (zero), the control section 75 determines that the correction by irradiation of the laser beam is unnecessary. The control section 75 determines whether the correction is necessary in the above-described manner. In a case where further correction is necessary, the control section 75 specifies the formation area of the correction region 58, and transmits an instruction to the correction section 73 based on a specified result.

[Correction Process, Steps S107 and S109 in FIG. 7]

The process is to form the correction region 58 in the inspection object sensor 10i that has been determined to require correction in the correction necessity determination process.

More specifically, when receiving the instruction indicating that the correction is necessary from the control section 75, the correction section 73 operates the laser marking machine 77, and applies a laser beam to a part of the first irradiation surface 571 only by the instructed area (A12 . . . ), thereby forming the correction region 58 (step S109). Note that the inspection object sensor 10i has arrived the correction section 73 before the application of the laser beam is performed. The inspection object sensor 10i provided with the correction region 58 is moved to the second inspection section 74.

In contrast, in a case where the correction section 73 receives the instruction indicating that the correction is unnecessary from the control section 75, the correction section 73 does not form the correction region 58 (step S107).

[Second Inspection Process, Step S111 in FIG. 7]

The process is to detect the actually-measured temperature Ta of the inspection object sensor 10i passed through the correction process.

More specifically, the second inspection section 74 detects the actually-measured temperature Ta again for the inspection object sensor 10i in which the correction region 58 has been formed by the correction section 73 and the inspection object sensor 10i in which the correction region 58 has not been formed by the correction section 73. The contents are similar to those in the temperature detection performed by the first inspection section 72, and the detected actually-measured temperature Ta is transmitted to the control section 75.

Note that reinspection is also performed on the inspection object sensor 10i, the correction of which has been determined unnecessary in the inspection by the first inspection section 72, in order to ensure the inspection; however, the reinspection for the inspection object sensor 10i may be omitted as a matter of course. In this case, as illustrated in FIG. 5, a branched path may be provided on the conveyance path 71 between the first inspection section 72 and the correction section 73, and the inspection object sensor 10i that does not need the correction may be conveyed to the branched path 79.

[Acceptance Determination Process, Steps S113, S115, and S117 in FIG. 7]

The process is to determine, based on the actually-measured temperature Ta detected by the inspection object sensor 10i in the second inspection process, whether the correction of the detected temperature is necessary.

More specifically, when acquiring the actually-measured temperature Ta from the second inspection section 74, the control section 75 determines whether further correction is necessary, in a manner similar to step S105 in FIG. 7 (step S113). In a case where the correction is unnecessary, the inspection object sensor 10i is conveyed as an accepted product (step S115). In a case where the correction is necessary, the inspection object sensor 10i is conveyed as an unaccepted product toward a branched path 79 branched from the conveyance path 71, and for example, is fed and inspected again in the inspection-correction line 70, or is corrected by other means (step S117).

The correction region 58 provided in the inspection object sensor 10i that is conveyed out as the accepted product is different in area for each inspection object sensor 10i. In other words, as illustrated in FIG. 3, the area of the formed correction region 58 is made large in the inspection object sensor 10i that is large in correction amount of the detected temperature of the temperature sensor 10 because the detected temperature of the temperature sensor 10 is decreased in proportion to the area of the correction region 58. In contrast, in the inspection object sensor 10i small in correction amount, the area of the correction region 58 is made small.

As described above, the correction degree of the detected temperature is adjusted according to the area to which the laser beam is applied; however, the correction degree may be adjusted according to intensity of the laser beam to be applied. More specifically, the degree of the surface roughness of the part irradiated with the laser beam is varied according to the intensity of the applied laser beam.

Figure 4:
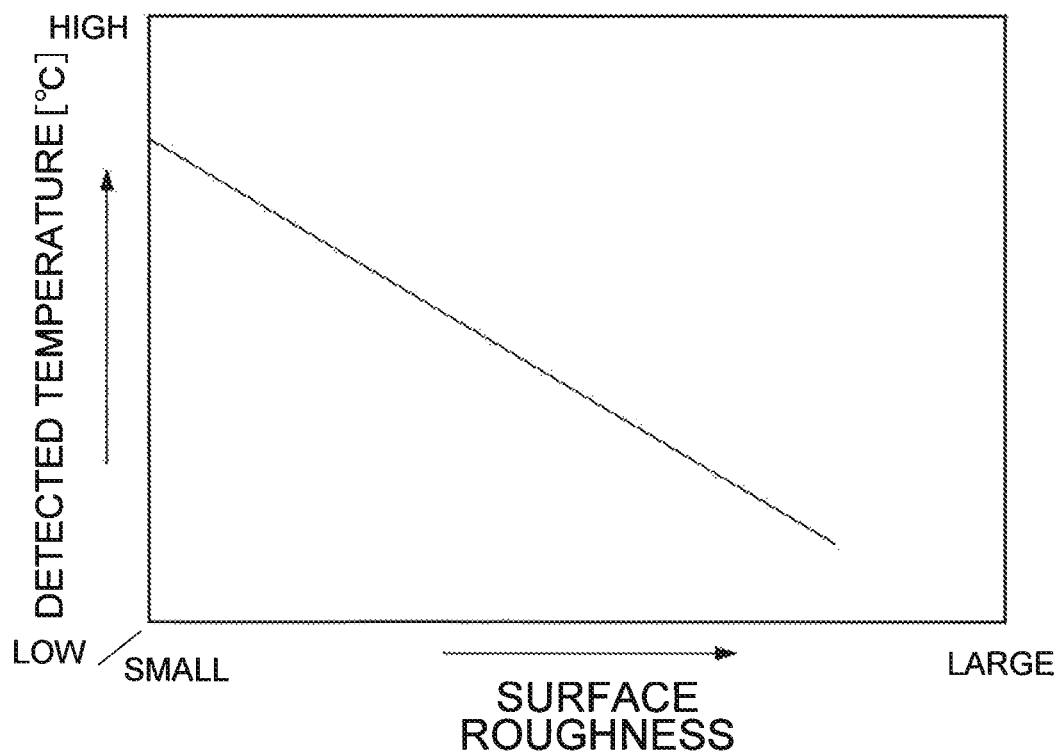
FIG. 4 is a graph illustrating relationship between surface roughness of the correction region and the detected temperature.

FIG. 4 illustrates variation of the detected temperature of the temperature sensor 10 when the surface roughness of the correction region 58 is changed. It is found from FIG. 4 that changing the degree of the surface roughness of the correction region 58 makes it possible to correct the detected temperature.

In other words, changing the intensity of the laser beam makes it possible to form the correction region 58 with desired emissivity.

[Effects of Temperature Sensor 10 and Manufacturing Method Thereof]

First, effects achieved by the temperature sensor 10 are described.

In the temperature sensor 10, the correction region 58 that includes the surface roughness larger than that of the irradiation surface 57 is provided. The emissivity of the infrared rays of the correction region 58 is higher than that of the irradiation surface 57. Therefore, the amount of the infrared rays reaching the film 40 is reduced due to formation of the correction region 58, which makes it possible to decrease the detected temperature of the temperature sensor 10.

Further, since the emissivity of the infrared rays of the correction region 58 is changed by changing the area of the correction region 58, it is possible to correct the detected temperature to a predetermined value.

As described above, the detected temperature is correctable through formation of the correction region 58 on the irradiation surface 57. This makes it possible to secure responsiveness also after the correction. In addition, since the visual field area of the infrared entrance window 26 through which the infrared rays are taken is maintained, it is possible to use the temperature sensor 10 under a temperature detection condition same as that of the temperature sensor not subjected to the correction. Moreover, the correction region 58 is formed through application of the laser beam. A workload is small and the cost is suppressed as compared with a case where a mechanical element is added.

Next, effects achieved by the method of manufacturing the temperature sensor 10 are described.

It is possible to correct the detected temperature shift of the infrared temperature sensor and to reduce occurrence of defective product by the method of manufacturing (process of forming) the temperature sensor 10 according to the present embodiment.

In addition, it is possible to pick up, by the first inspection process, only the inspection object sensor 10i requiring correction, and corrects the picked-up inspection object sensor 10i to proper detected temperature.

Furthermore, it is possible to more surely manufacture the temperature sensor 10 with the proper detected temperature by the second inspection process.

As described above, the present invention has been described based on the preferred embodiment; however, the configurations described in the above-described embodiment may be selected or appropriately modified without departing from the scope of the present invention.

The present invention may adopt, as the other means of forming the correction region, grinding of the irradiation surface 57 by a tool, melting of the irradiation surface 57 by heating means, or etching of the irradiation surface 57 with an etchant. The grinding, the melting, and the etching each change the surface roughness of the irradiation surface 57 to form the correction region 58 as with the application of a laser beam. In addition, the grinding, the melting, and the etching each supply energy from the outside to form, in the irradiation surface 57, an irradiation region different in surface roughness from surroundings, as with the application of a laser beam.

In the present invention, a coating film that is formed through application of an ink or a paint on the first irradiation surface 571 to the fourth irradiation surface 574, may be used as the correction region, in addition to correction of the surface roughness described above. In this case, the ink and the paint are at least different from each other in that the main object of the ink is coloring whereas the main object of the paint is protection of a base material; however, both can form the correction region that is different in emissivity from the surrounding irradiation surface 57 when applied.

Examples of the ink forming the correction region include a black ink that absorbs infrared rays on an assumption that the ink includes heat resistance. This is true of the paint.

Increasing the area of the coating film configuring the correction region makes it possible to increase the emissivity of the infrared rays of the irradiation surface 57, as with the present embodiment.

Further, a sheet member that is different in emissivity from the irradiation surface 57 may be bonded to the irradiation surface 57 to form the correction region.

The correction region formed of the coating film is also formed in the above-described correction process.

A shape of the coating film and a method of forming the coating film are optional; however, printing by an inkjet printer is preferable in order to accurately control an application amount and an application range of the ink.

In the case where the coating film is printed by the inkjet printer, the above-described correction section 73 of the inspection-correction line 70 includes the inkjet printer. The inkjet printer performs printing with a predetermined area at predetermined positions in one or two or more of the first irradiation surface 571, the second irradiation surface 572, the third irradiation surface 573, and the fourth irradiation surface 574, based on an instruction from the control section 75, thereby forming the correction region.

Further, the example in which the emissivity of the infrared rays of the correction region is made higher than that of the surroundings has been described in the above-described embodiment; however, the present invention is not limited thereto.

For example, the emissivity of the infrared rays of the formed correction region may be made higher or lower than that of the surroundings depending on the ink or the paint configuring the coating film. In other words, forming the coating film including the emissivity of the infrared rays higher than that of the irradiation surface 57 or forming the coating film including the emissivity of the infrared rays lower than that of the irradiation surface 57 makes it possible to realize correction decreasing the detected temperature or correction increasing the detected temperature.

In the case where the shift amount is a negative value in the formation process in the above-described embodiment, it is necessary to decrease the detected temperature. Therefore, the coating film including the emissivity of the infrared rays higher than that of the irradiation surface 57 is formed. In contrast, in the case where the shift amount is a positive value, it is necessary to increase the detected temperature. Therefore, the coating film including the emissivity of the infrared rays lower than that of the irradiation surface 57 is formed.

As the mode using the coating film in the correction region, the correction region previously formed as the coating film may be peeled by a predetermined area, to correct the detected temperature. In other words, the correction region may be formed by a coating film that includes the emissivity of the infrared rays lower than that of the irradiation surface 57. In the case where the correction decreasing the detected temperature is necessary, the correction region may be peeled by a predetermined area to correct the detected temperature to the predetermined value.

In addition, the correction region may be formed by a coating film that includes the emissivity of the infrared rays higher than that of the irradiation surface 57. In the case where the correction increasing the detected temperature is necessary, the correction region may be peeled by a predetermined area to correct the detected temperature to the predetermined value.

Also in a mode in which the irradiation region different in surface roughness from the surroundings is formed on the irradiation surface 57, the surface roughness of the correction region 58 may be made larger or smaller than the surface roughness of the surroundings. In other words, in the mode in which the surface roughness is corrected, the emissivity of the infrared rays in the correction region may be made low or high.

The example in which the correction region 58 different in emissivity from the surroundings is provided has been described in the above-described embodiment; however, the present invention is not limited to thereto, and includes an example in which a correction region different in emissivity of the infrared rays from other regions of the irradiation surface 57 is provided. The example is described below with the irradiation surface 57 as an example.

FIG. 10A illustrates the developed irradiation surface 57. The irradiation surface 57 is partitioned into the first irradiation surface 571 to the fourth irradiation surface 574, namely, includes the plurality of partitioned surfaces. In this case, the correction region 58 may be provided on the whole of the first irradiation surface 571 as illustrated in FIG. 10A, or the correction region 58 may be provided on a plurality of irradiation surfaces, for example, in the whole of the first irradiation surface 571 and the whole of the second irradiation surface 572 as illustrated in FIG. 10B.

Figure 11A:
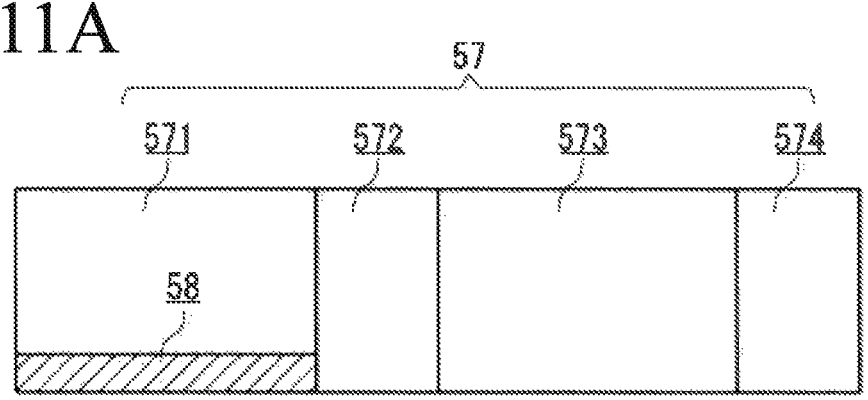
FIG. 11 is a diagram illustrating another example of the correction region.
Figure 11B:
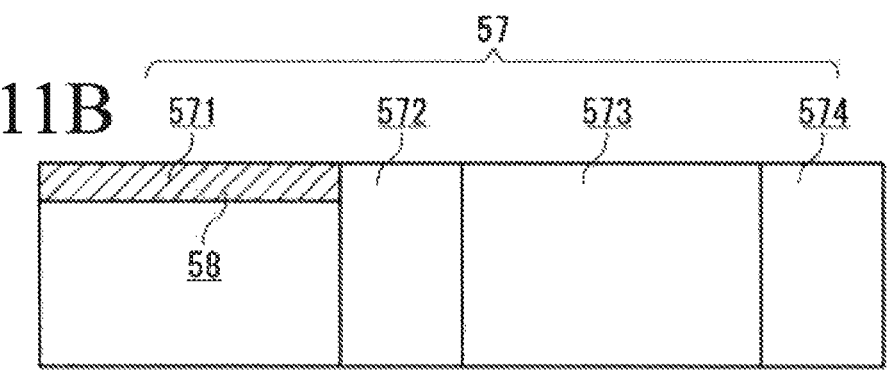
Figure 11C:
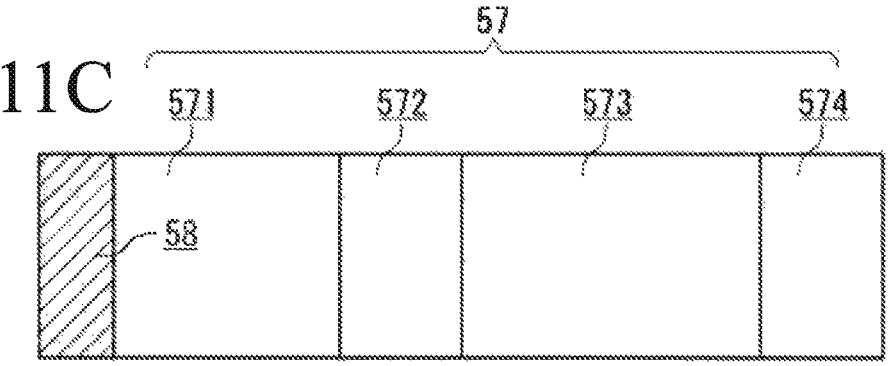
Figure 11D:
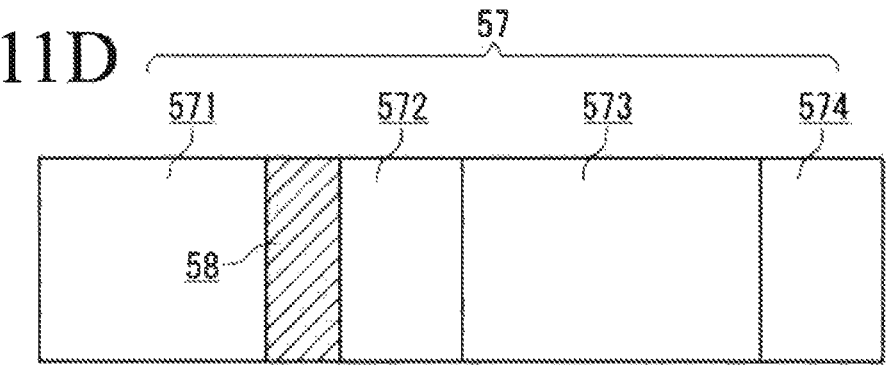

In addition, as illustrated in FIGS. 11A to 11D, for example, the correction region 58 may be provided on a part of the first irradiation surface 571. The partial correction region 58 may be provided on lower side in a biased manner as illustrated in FIG. 11A, or may be provided on upper side in a biased manner as illustrated in FIG. 11B. Moreover, the partial correction region 58 may be provided on right side in a biased manner as illustrated in FIG. 11C, or may be provided on left side in a biased manner as illustrated in FIG. 11D.

Further, when the light guide part is developed in the case where the light guide part has the cylindrical shape, the irradiation surface 57 includes a single continuous surface without partition as illustrated in FIGS. 10C and 10D. In this case, as illustrated in FIGS. 10C and 10D, the correction region 58 may be provided on a part of the single surface in a biased manner.

As for the configuration of the temperature sensor applied to the present invention, the infrared absorbing molded body 50 is attached inside the first case 20 in the present embodiment. Alternatively, the present invention is applicable to a temperature sensor not attached with the infrared absorbing molded body 50. The temperature sensor includes an irradiation surface, similar to the irradiation surface 57, directly provided on the inner surface of the first case 20 communicating with the infrared entrance window 26, and the correction region is provided on the irradiation surface.

In addition, in the present invention, the correction region may be provided over the film 40 as long as the correction region has a small area.

Furthermore, in the present invention, as long as the infrared detection element and the temperature compensation element are held by the heat conversion film and the light guide part 59 configuring the light guide path of the infrared rays is provided, the correction region of the present invention may be provided on the irradiation surface irrespective of the shape and the size thereof.

For example, the body part 22 is provided in the first case 20 in the present embodiment; however, the present invention is applicable to a temperature sensor that does not include the body part 22 and includes the light guide part configured only by the base part 21.

Further, the light guide part 59 surrounds the first air gap 53 in a peripheral direction without any gap in the present embodiment; however, the present invention is not limited thereto. For example, a part of the partition wall 52 of the infrared absorbing molded body 50 may be removed and a part of the first air gap 53 in the peripheral direction may be opened within a range securing the function as the light guide part 59.

Moreover, the light guide part 59 has the square-cylindrical shape; however, the light guide part of the present invention is not limited thereto, and may have a cylindrical shape. Further, the shape of the light guide part of the present invention is optional without being limited to the cylindrical shape as long as the light guide part includes a surface that radiates the incident infrared rays. For example, the light guide part 59 may have a gate shape excluding the third irradiation surface 573 that configures the square-cylindrical light guide part 59, or the light guide part 59 may have a plate shape including, for example, only the first irradiation surface 571 that configures the square-cylindrical light guide part 59. In the plate-like light guide part, at least one of front and rear surfaces serves as an irradiation surface.

This is true of the blocking part 27. For example, a part of the partition wall 52 of the infrared absorbing molded body 50 may be removed and a part of the second air gap 54 in the peripheral direction may be opened within a range securing the function as the blocking part 27.

The infrared detection element 43 and the temperature compensation element 45 are adjacently held by the single film 40 forming the same plane in the present embodiment; however, the present invention is not limited thereto. For example, the infrared detection element 43 and the temperature compensation element 45 may be adjacent to each other while being shifted in position in a front-rear direction in which the infrared rays enter. As an example, the temperature compensation element 45 may be provided on a rear of the infrared detection element 43, with respect to the entering infrared rays. Note that, in the case where the infrared detection element 43 and the temperature compensation element 45 are held by the single film 40, it is necessary to fold the film 40 in a substantially C-shape according to the arrangement of the infrared detection element 43 and the temperature compensation element 45.

Further, the infrared detection element 43 and the temperature compensation element 45 are disposed at the respective positions line-symmetrical about the center of the film 40 in the longitudinal direction in the present embodiment; however, the present invention is not limited thereto.

REFERENCE SIGNS LIST

1 Toner fixing unit
2, 3 Roller
10 Infrared temperature sensor, temperature sensor
10*i* Inspection object sensor
20 First case
21 Base part
22 Body part
23 Side wall
24 Upper wall
25 Air gap
26 Infrared entrance window
27 Blocking part
30 Second case
31 Base part
32 Element housing part
33 Housing concave part
34 Bottom floor
40 Heat conversion film, film
43 Infrared detection element
45 Temperature compensation element
50 Infrared absorbing molded body
51 Peripheral wall
52 Partition wall
53 First air gap
531 Inner surface
54 Second air gap
541 Inner surface
57 Irradiation surface
571 First irradiation surface
572 Second irradiation surface
573 Third irradiation surface
574 Fourth irradiation surface
58 Correction region
59 Light guide part 70 Correction line
71 Conveyance path
72 First inspection section
73 Correction section
74 Second inspection section
75 Control section
76 Prescribed value heater
77 Laser marking machine
78 Prescribed value heater
79 Branched path
L Downstream side
U Upstream side

The invention claimed is:

1. An infrared temperature sensor that detects temperature of a detection object in a non-contact manner according to infrared rays radiated from the detection object, the infrared temperature sensor configured to be used so as to be disposed facing the detection object, the infrared temperature sensor comprising:
a heat conversion film configured to be irradiated with the infrared rays radiated from the detection object and to convert the incident infrared rays into heat;
a blocking part disposed facing the heat conversion film, and configured to block the infrared rays radiated from the detection object, from being incident on a part of the heat conversion film;
an infrared detection element that is held in a region of the heat conversion film irradiated with the infrared rays radiated from the detection object;
a temperature compensation element that is held in a region of the heat conversion film blocked from the infrared rays by the blocking part; and
a light guide part including an irradiation surface and configured to guide the infrared rays radiated from the detection object to the region where the infrared detection element is provided, wherein
the irradiation surface includes a correction region that is different in emissivity of the infrared rays from another region, wherein the correction region is higher or lower in the emissivity of the infrared rays than the other region and the correction region is larger or smaller in surface roughness than the other region.

2. The infrared temperature sensor according to claim 1, wherein the correction region is formed through supply of energy from outside.

3. The infrared temperature sensor according to claim 2, wherein the energy from outside is supplied through application of a laser beam.

4. An infrared temperature sensor that detects temperature of a detection object in a non-contact manner according to infrared rays radiated from the detection object, the infrared temperature sensor configured to be used so as to be disposed facing the detection object, the infrared temperature sensor comprising:
a heat conversion film configured to be irradiated with the infrared rays radiated from the detection object and to convert the incident infrared rays into heat;
a blocking part disposed facing the heat conversion film, and configured to block the infrared rays radiated from the detection object, from being incident on a part of the heat conversion film;
an infrared detection element that is held in a region of the heat conversion film irradiated with the infrared rays radiated from the detection object;
a temperature compensation element that is held in a region of the heat conversion film blocked from the infrared rays by the blocking part; and
a light guide part including an irradiation surface and configured to guide the infrared rays radiated from the detection object to the region where the infrared detection element is provided, wherein
the irradiation surface includes a correction region that is different in emissivity of the infrared rays from another region, wherein the correction region is higher or lower in the emissivity of the infrared rays than the other region and the correction region includes a coating film or a sheet member that is higher or lower in the emissivity of the infrared rays than the other region.

5. The infrared temperature sensor according to claim 1, wherein
the irradiation surface is partitioned into a plurality of irradiation surfaces, and
the correction region is provided on at least one of the partitioned irradiation surfaces.

6. The infrared temperature sensor according to claim 5, wherein the correction region is provided on a whole or a part of one of the partitioned irradiation surfaces.

7. The infrared temperature sensor according to claim 1, wherein
the irradiation surface includes a single continuous surface, and
the correction region is provided on a part of the single surface.

8. The infrared temperature sensor according to claim 1, wherein the other region is provided around the correction region.

9. The infrared temperature sensor according to claim 1, wherein
the light guide part has a cylindrical shape, and
the irradiation surface is provided on an inner surface of the cylindrical light guide part.

10. The infrared temperature sensor according to claim 1, further comprising a first case and a second case disposed facing the first case, wherein
the first case includes the blocking part and the light guide part, and
the first case and the second case sandwich the heat conversion film.

11. The infrared temperature sensor according to claim 10, wherein the second case includes a housing concave part housing the infrared detection element and the temperature compensation element that are held on a surface of the heat conversion film on a side opposite to the detection object.

12. The infrared temperature sensor according to claim 10 wherein the irradiation surface and the correction region are provided directly on the light guide part of the second case, or on an infrared absorbing molded body that is configured to be attached to the light guide part of the second case.

13. A method of manufacturing the infrared temperature sensor according to claim 1, the method comprising:
a determination step of determining necessity of correction for an inspection object sensor, based on prescribed temperature Tr and actually-measured temperature Ta that is acquired by actually performing temperature detection with use of the inspection object sensor; and
a correction step of forming, on the irradiation surface of the inspection object sensor, the correction region that is different in emissivity of the infrared rays from surroundings, based on a result of the determination in the determination step.

14. The infrared temperature sensor according to claim 11 wherein the irradiation surface and the correction region are provided directly on the light guide part of the second case, or on an infrared absorbing molded body that is configured to be attached to the light guide part of the second case.

15. The method according to claim 13, wherein in the correction step, the correction region is formed through application of a laser beam to a part of the irradiation surface.

16. The method according to claim 13, wherein in the correction step, the correction region is formed by a coating film or a sheet member that is higher or lower in the emissivity of the infrared rays than the other region.

17. An infrared temperature sensor that detects temperature of a detection object in a non-contact manner according to infrared rays radiated from the detection object, the infrared temperature sensor configured to be used so as to be disposed facing the detection object, the infrared temperature sensor comprising:
    a heat conversion film configured to be irradiated with the infrared rays radiated from the detection object and to convert the incident infrared rays into heat;
    a blocking part disposed facing the heat conversion film, and configured to block the infrared rays radiated from the detection object, from being incident on a part of the heat conversion film;
    an infrared detection element that is held in a region of the heat conversion film irradiated with the infrared rays radiated from the detection object;
    a temperature compensation element that is held in a region of the heat conversion film blocked from the infrared rays by the blocking part; and
    a light guide part including an irradiation surface and configured to guide the infrared rays radiated from the detection object to the region where the infrared detection element is provided, wherein
the irradiation surface includes a correction region that is different in emissivity of the infrared rays from another region and wherein the correction region is provided on an inner wall of the light guide part.

* * * * *

UNITED STATES PATENT AND TRADEMARK OFFICE
CERTIFICATE OF CORRECTION

PATENT NO. : 10,533,898 B2
APPLICATION NO. : 15/781829
DATED : January 14, 2020
INVENTOR(S) : Jun Kanaya et al.

It is certified that error appears in the above-identified patent and that said Letters Patent is hereby corrected as shown below:

In the Specification

Column 4, Line 62, "Id-id" should read -- 1d-1d --

Signed and Sealed this
Seventh Day of April, 2020

Andrei Iancu
*Director of the United States Patent and Trademark Office*